US012197432B1

(12) United States Patent
Periwal

(10) Patent No.: US 12,197,432 B1
(45) Date of Patent: *Jan. 14, 2025

(54) JSON PERSISTENCE SERVICE

(71) Applicant: Software Tree, LLC, Campbell, CA (US)

(72) Inventor: Damodar Das Periwal, Campbell, CA (US)

(73) Assignee: Software Tree, LLC, Campbell, CA (US)

(*) Notice: Subject to any disclaimer, the term of this patent is extended or adjusted under 35 U.S.C. 154(b) by 152 days.

This patent is subject to a terminal disclaimer.

(21) Appl. No.: 17/726,458

(22) Filed: Apr. 21, 2022

Related U.S. Application Data

(63) Continuation of application No. 17/039,446, filed on Sep. 30, 2020, now Pat. No. 11,347,732.

(Continued)

(51) Int. Cl.
*G06F 16/245* (2019.01)
*G06F 16/23* (2019.01)
*G06F 16/25* (2019.01)

(52) U.S. Cl.
CPC ........ *G06F 16/245* (2019.01); *G06F 16/2379* (2019.01); *G06F 16/252* (2019.01)

(58) Field of Classification Search
CPC . G06F 16/2379; G06F 16/2458; G06F 16/252
See application file for complete search history.

(56) References Cited

U.S. PATENT DOCUMENTS 6,163,776 A * 12/2000 Periwal ............... G06F 16/289
10,025,599 B1 * 7/2018 Goodson .............. G06F 16/00
(Continued)

OTHER PUBLICATIONS

Sweeney. "Dockerize your Java Application". Dec. 6, 2018 [retrieved on Mar. 9, 2024]. Cloud Tidbits . https://medium.com/cloud-tidbits/dockerize-your-java-application-ec7ac056d066 (Year: 2018).*

(Continued)

*Primary Examiner* — James E Richardson
(74) *Attorney, Agent, or Firm* — Ansari Katiraei LLP; Arman Katiraei; Sadiq Ansari

(57) ABSTRACT

Technologies for storing and accessing data from persisted data objects of an object-oriented system are provided. The disclosed techniques include a system that receives, a first request to perform an operation on data of data objects, where the data objects are capable of being persisted in a database. The system generates a second request by translating the first request from a first programming language to a second programming language. The system uses an object relational mapping data structure, which maps data object attributes to database properties, to map the second request parameters to corresponding database operation parameters. The system generates one or more database requests based on the corresponding database operation parameters and causes the one or more database requests to be executed on the database. The disclosed techniques describe creating and running a RESTful microservice to persist JSON objects in a relational database. The disclosed microservice may be deployed using a Docker container for cloud or on-premises implementations.

19 Claims, 8 Drawing Sheets

Related U.S. Application Data

(60) Provisional application No. 62/909,122, filed on Oct. 1, 2019.

(56) References Cited

U.S. PATENT DOCUMENTS

| | | | |
|---|---|---|---|
| 10,437,564 B1* | 10/2019 | Periwal | G06F 8/315 |
| 10,585,720 B1* | 3/2020 | Kesler | G06F 16/211 |
| 2008/0228697 A1* | 9/2008 | Adya | G06F 16/212 |
| 2015/0026189 A1* | 1/2015 | Li | G06F 16/245 |
| | | | 707/769 |
| 2015/0378685 A1* | 12/2015 | Kaplinger | H04L 67/535 |
| | | | 717/104 |
| 2016/0085779 A1* | 3/2016 | Rosier | G06F 16/213 |
| | | | 707/803 |
| 2017/0116436 A1* | 4/2017 | Wu | H04W 12/02 |
| 2017/0351716 A1* | 12/2017 | Higginson | G06F 16/285 |
| 2022/0043639 A1* | 2/2022 | Jennings | G06F 9/541 |

OTHER PUBLICATIONS

Kumar et al. "webserver—What is the difference between asynchronous and synchronous HTTP request?". May 2013 [retrieved on Mar. 9, 2024]. Stack Overflow. https://stackoverflow.com/questions/16715380/what-is-the-difference-between-asynchronous-and-synchronous-http-request) (Year: 2013).*

* cited by examiner

JSON PERSISTENCE SERVICE

CROSS-REFERENCE TO RELATED APPLICATIONS; BENEFIT CLAIM

This application claims the benefit under 35 U.S.C. 120 as a continuation of application Ser. No. 17/039,446, filed Sep. 30, 2020, which claims the benefit of provisional application 62/909,122, filed Oct. 1, 2019, the entire contents of each of which is hereby incorporated by reference as if fully set forth herein, under 35 U.S.C. § 119 (e).

This application is related to U.S. Pat. No. 10,437,564, granted on Oct. 8, 2019, the entire contents of which are hereby incorporated by reference as if fully set forth herein. This application is related to U.S. Pat. No. 6,163,776, granted on Dec. 19, 2000, the entire contents of which are hereby incorporated by reference as if fully set forth herein. The applicants hereby rescind any disclaimer of claim scope in the priority applications or the prosecution history thereof and advise the USPTO that the claims in this application may be broader than any claim in the priority application.

TECHNICAL FIELD

The present disclosure generally relates to transferring data and commands between computing systems. The disclosure relates more specifically to persisting data objects in storage systems.

BACKGROUND

Computer systems use data objects to transfer data between different computing elements. For example, a server running a computer program may send data objects to client computers and vice-versa. The data objects may encapsulate data such as multiple different properties or attributes. The client computers, running computer programs, may receive the data objects and analyze the corresponding data to perform various tasks. One such example of a data object used to transfer information across computing elements is a JavaScript Object Notation (JSON) object. JSON is implemented as text formatted data that uses either name/value pairs and/or ordered lists to arrange data in a programming language independent format that may be utilized by computer applications written in different programming languages.

In many implementations, data objects, such as JSON objects are represented as live objects within volatile memory that are accessed by running computer applications. However, in some cases data within JSON objects may need to be stored in persistent storage in order to make the data available for future needs. For example, it may be needed to store JSON objects in persistent storage if a running computer application needs to be restarted or stopped. JSON objects, and other data objects, may be stored (persisted) as a plain text file or a formatted object file within a storage repository, such as a hard drive or cloud storage. One such drawback, to storing data objects within a storage repository is that in order to query elements of a data object, the data object needs to be reloaded into the corresponding computer program. For example, if JSON objects containing employee information are stored within files on disk, then in order to query property values of employees, such as which employees have management experience, the computer application will need to reload the JSON objects back into memory in order to query which employees satisfy the management experience criteria. Reloading the JSON objects into memory for query purposes uses considerable processing and memory resources to perform queries on persisted data objects that are no longer in memory.

Other approaches to persisting data objects may include storing the data objects within a relational database. Relational databases use tables with rows and columns. Each database column represents a type of data value of a particular database table. Each database row represents a particular record of data. The data is maintained and manipulated using a database management system (DBMS). Example DBMSs may include, but are not limited to, Oracle®, MySQL®, SQL Server®, Postgres®, and SQLite®, which are examples of relational DBMSs. managing a relational database is called a Relational Database Management System (RDBMS). are examples of an RDBMS. The DBMS is configured to receive data query requests and data manipulation requests from computer applications. For example, the computer application that uses data objects may store the data objects in the database by sending an insert request to the DBMS to insert the data object into one or more tables. Conventional DBMSs use various datatypes to store data in the database. For instance, a number value may be stored using an INTEGER datatype. A word or phrase may be stored using a fixed character (CHAR) or a TEXT datatype. Another datatype is a binary large object (BLOB) which is used for large data objects of any types, such as documents, audio files, video files, or any other object. For storing data objects, such as a JSON object, the DBMS may store the JSON object as a BLOB or a TEXT datatype. However, one of the drawbacks to storing the data object as a BLOB or TEXT is that it becomes difficult to query against. For example, if JSON objects containing employee information are stored as BLOBs, then it becomes difficult to query based on a specific attribute of the JSON object as the entire JSON object is stored as one single BLOB datatype. Databases typically create indexes on values in columns in order to quickly query against those values. BLOBs or TEXTs for instance, may have several different data properties embedded in the data. Since a BLOB or TEXT is not standardized based on the different data properties, database cannot utilize index functionality to query those properties.

DETAILED DESCRIPTION

Figure 1:
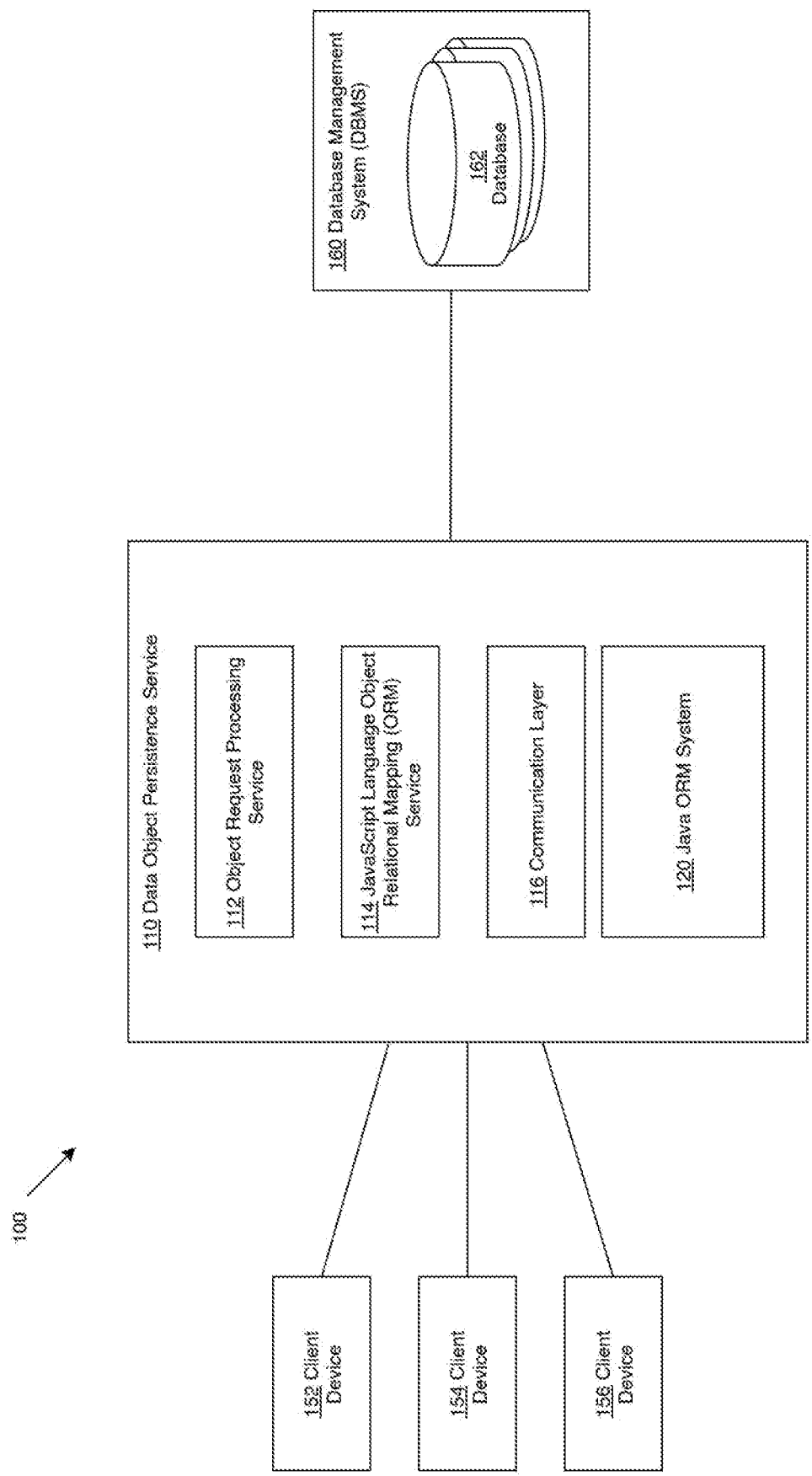
FIG. 1 is a block diagram that depicts a system for persisting data, from data objects of an object model, into database storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, an application system implements a data object persistence service to persist data of one or more data objects, belonging to an object model, in a relational database system. The object model may be at least partially defined by a JSON object class. A first request to perform an operation on data of the one or more data objects is received from a client device. The application system may generate a second request, by translating the first request from a first programming language to a second programming language. The application system may use an object relational mapping (ORM) data structure to map one or more parameters in the second request to corresponding database operation parameters. The ORM data structure may include information that map attributes of the object model to corresponding database attributes defined within a database schema (tables and constraints) of the database. In an embodiment, the ORM data structure may include, but is not limited to, object class information, object attribute information, primary key information, table information, and column information. The application system generates one or more database requests based on the corresponding database operation parameters mapped to the parameters of the second request. The application system causes the one or more database requests to be executed on the database.

In an embodiment, generation of the second request to perform the operation on the one or more data objects includes parsing the first request to identify one or more first request parameters. An object request processing service, running within the application system, generates and sends a JavaScript request to a JavaScript language ORM service. The JavaScript request includes one or more JavaScript parameters representing the one or more first request parameters. The JavaScript language ORM service receives the JavaScript request and parses and identifies the JavaScript parameters. A second request is generated to perform the operation on the one or more objects by mapping the JavaScript parameters from the JavaScript request to corresponding Java parameters.

The disclosed approaches provide advantages over conventional solutions by providing services to persist data objects within database storage using formatted data objects and requests that include parameters values that are mapped to a corresponding container class. The container class is used to identify and map attributes within the data object to corresponding table columns within a database. Mapping input parameters to a container class reduces the need for manual customization of application programming interfaces (APIs) used by client devices to query, modify, insert, or delete data objects of various types from database storage. The disclosed framework provides an easily extendable and customizable interface that is able to process data values in different data formats in order to persist data from complex data objects.

The disclosed system provides a framework to efficiently store, retrieve, and search for property values, within data objects of an object-oriented system, that are stored in a database; thereby reducing processing resources and memory resources otherwise used to load entire data objects in memory for the purpose of searching against their respective property values. The disclosed system allows for simple and easy customization for various data object formats that may be used by various connected devices, such as Internet of Things (IoT) devices, and various data formats that may be used in different industries, such as commercial manufacturing, healthcare, insurance assessment, telecommunications, transportation, energy production and monitoring, and any other industry where complex data objects may be generated and relied upon.

System Overview

FIG. 1 is a block diagram that depicts system for persisting data, from data objects belonging to an object-oriented system, in database storage. System 100 may represent one or more software applications. In an embodiment, system 100 may be implemented using one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to receive and process requests to query and/or manipulate data persisted in database storage.

In an embodiment, elements of system 100 may be implemented as a microservice distributed on one or more computing devices or deployed within a cloud computing environment. Implementation of microservices represents an approach to develop an application as a set of smaller services, which each run their own process and communicate with each other using lightweight communication protocols such as HTTP. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

In an embodiment, system 100 may be implemented using a containerized program system such as DOCKER or KUBERNETES. A container is a standard unit of software that contains a package of code and any dependencies needed to execute the package of code. A Docker container image is a lightweight, standalone, executable package of software that includes all of the elements needed to run the application, including code, runtime environment, system tools, system libraries, and configuration settings. Container images become containers at runtime. For example, a docker container image, which includes an executable package of software representing system 100, may be deployed as a docker container when executed by a Docker Engine. In another example, elements of system 100 may be deployed as microservices in a container orchestration platform, such as Kubernetes. Kubernetes is a portable, extensible, open-source platform for managing containerized workloads and services.

In an embodiment, system 100 may include a data object persistence service 110, a database management system (DBMS) 160, and client devices 152-156. System 100 may represent one example arrangement and other system arrangements may include more or less components than what is depicted in system 100.

In an embodiment, clients that send requests to either store, retrieve, modify, or remove data from persistent storage, such as a database, may use client devices 152-156 to send their requests to and receive responses back from the data object persistence service 110. The client devices 152-156 may represent computing devices including, but not limited to, desktop computers, laptop computers, tablet computers, wearable devices, video game consoles, smartphones, IoT devices, and any other computing system configured with software implemented to communicate with the data object persistence service 110.

Data Object Persistence Service

The data object persistence service 110 receives data requests from client devices 152-156 and translates the data requests into database operations that are then sent to the DBMS 160 for execution. The DBMS may represent a database management system that hosts a database 162. An example of the DBMS 160 and the database 162 is described in the DBMS OVERVIEW section herein.

In an embodiment, the data object persistence service 110 may provide an application programming interface (API) to client devices 152-156 that allows clients to perform various data queries and data manipulation operations on data stored in the database 162. In an embodiment, the APIs provided by the data object persistence service 110 may be Representational State Transfer (REST) APIs. The REST APIs, provided by the data object persistence service 110, allow clients to perform CRUD (create, retrieve, update, and delete) operations on data stored in the DBMS 160 using the REST APIs as an interface to the CRUD operations. When a REST API is called by client device 152, the data object persistence service 110 receives the API call, processes the call, generates corresponding database operations, communicates the database operations to the DBMS 160, receives a result back from the DBMS 160, and sends to the client device 152 a representation of the state of the requested resource. For example, if the API call from the client device 152 is a call to retrieve information for a specific employee, then the data object persistence service 110 would return the state of that specific employee in the form of a data object, which may include their name, employee ID, salary, experience, job title, and any other employee information.

In an embodiment, the representation of the state may be in a JavaScript Object Notation (JSON) format. JSON is a lightweight data-interchange format that uses human-readable text to store and transmit data objects containing attribute-value pairs, array data types, and/or any other serializable value. When JSON objects have the same set of attribute name/value pairs, the JSON objects may belong to a conceptual JSON object class (type). A conceptual JSON object class may be a JavaScript language JSON object class. For example, ECMAScript 6 (ES6) specifies a way to define a JSON object class. A Java container class may be defined for each conceptual JSON object class such that an instance of a container class encapsulates a JSON data object. In other embodiments, the representation of the state may use other data formats such as XML.

Appendix A contains example RESTful APIs provided to client devices 152-156 by the data object persistence service 110. The RESTful APIs provided by the data object persistence service 110 are not limited to the ones listed in Appendix A and may include more or less interfaces. In an embodiment, client device 152, using the RESTful APIs, may make a request to perform a query on data stored within the DBMS 160. For example, client device 152 may generate and send a "GET" call to the data object persistence service 110. The GET call may be represented as an HTTP call with the following universal resource identifier (URI): "http://localhost:80/jdx/v1/Employee?filter-exempt=true" where:
  "http://localhost:80/jdx/" represents the API route path prefix where the data object persistence service 110 is listening for requests on port 80 on the local machine;
  "v1" represents the version of the implementation code of the data object persistence service 110;
  "Employee" is the value of the class name parameter that is the subject of the query; and
  "filter-exempt=true" contains additional request parameters that indicate that only exempt Employee objects should be retrieved. Other types of parameters may include, but are not limited to, maximum number of objects to be retrieved.

Figure 7:
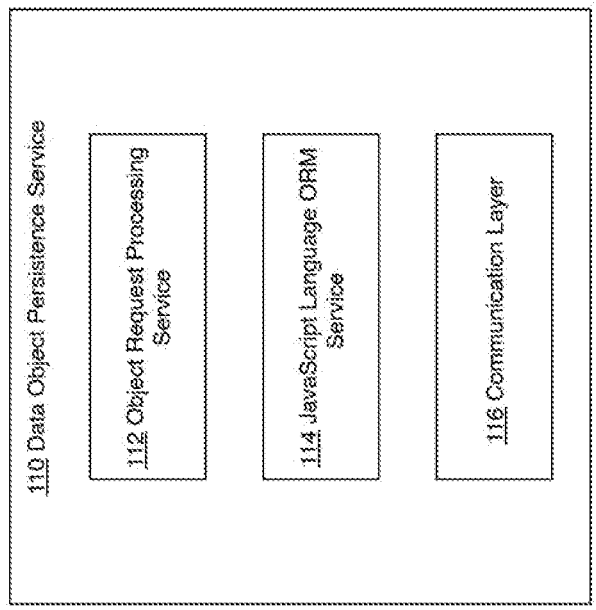
FIG. 7 depicts a block diagram of a data object persistence service and its services, according to an embodiment.

In an embodiment, the data object persistence service 110 includes, but is not limited to, an object request processing service 112, a JavaScript language ORM service 114, a communication layer 116, and a Java Object Relational Mapping (ORM) system 120. In another embodiment, the data object persistence service 110 includes the object request processing service 112, the JavaScript language ORM service 114, and the communication layer 116. FIG. 7 depicts an embodiment of the data object persistence service 110 and its services.

Object Request Processing Service

In an embodiment, the object request processing service 112 is implemented to parse and identify request parameters from requests received from client devices 152-156. The received requests may be RESTful API calls that contain URIs, including one or more parameters. The object request processing service 112 receives a request, such as a GET request with a URI:
"http://localhost:80/jdx/v1/Employee?filter-exempt=true"
and parses the URI and identifies any parameters associated with the requested action. For instance, the above URI contains the version, v1, and a class name parameter, Employee. The parameters further include "filter=exempt=true" which indicates that exempt Employee objects should be retrieved.

In an embodiment, upon parsing a request URI and identifying the request parameters, the object request processing service 112 generates a JavaScript language request representing the received request from the client device 152. The generated JavaScript language request may contain one or more parameters representing a container class name and additional parameters related to the type of operation to be performed. A Java container class may be defined for each conceptual JSON object class such that an instance of the container class encapsulates a JSON data object. In an embodiment, the object request processing service 112 may translate the class name, which may be a conceptual JSON object class name, into a container class name defined by a classnames mapping configuration. In an embodiment, the classnames mapping configuration may be represented as a mapping configuration file or multiple files that map conceptual JSON object class names specified as class name parameters in URIs to their corresponding container class names. For example, a conceptual JSON class name may be "Employee" and may map to the corresponding container class name of "MyCompanyEmployee" or any other name. In another embodiment, the object request processing service 112 may use the conceptual JSON class name "Employee" as the container class name or, in the absence of a classnames mapping configuration, or if the classnames mapping configuration does not contain mapping for the JSON conceptual class name "Employee".

By using a mapping configuration that maps a data object class name in input parameters to a container class name, the data object persistence service 110 allows for easy configuration changes based on changes to either the data object class name or the container class name. For example, if client device 152, using JSON data objects, updates its own configuration and changes the JSON object class name from "Employee" to "Personnel", then the configuration changes may easily be updated in the data object persistence service 110 by updating the classnames mapping configuration from Employee→MyCompanyEmployee (container class name) to Personnel→MyCompanyEmployee. Similarly, if the container class name is modified for Employee to a new container class named "MyCompany Volunteer", then the configuration changes may easily be updated in the data object persistence service 110 by updating the classnames mapping configuration from Employee→MyCompanyEmployee to Employee→MyCompany Volunteer (the new container class name).

In an embodiment, data of one or more data objects may be packaged differently in various parameters, by different services that make up the data object persistence service 110, as they are passed between the client, represented by client devices 152-156 and the DBMS 160.

Javascript Language ORM Service

Figure 2:
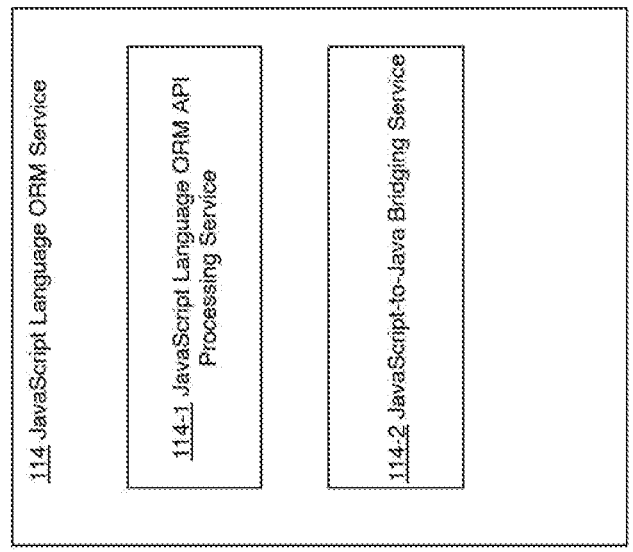
FIG. 2 is a block diagram depicting components that make up the JavaScript language ORM service, according to an embodiment.

The JavaScript request generated by the object request processing service 112 may be sent to the JavaScript language ORM service 114. In an embodiment, the JavaScript language ORM service 114 is implemented to receive a request, in the form of a JavaScript request, for example a JavaScript API call, and translate the JavaScript request into a corresponding Java request. FIG. 2 is an example block diagram depicting components that make up the JavaScript language ORM service 114. In an embodiment, the JavaScript language ORM service 114 includes a JavaScript language ORM API processing service 114-1 and a JavaScript-to-Java Bridging service 114-2. The JavaScript language ORM API processing service 114-1 may be implemented to parse and identify the request parameters from the received JavaScript request. The parameters may include the container class name, JavaScript method calls, and one or more JavaScript input parameters for the corresponding JavaScript method calls. The JavaScript language ORM API processing service 114-1 may send the parsed request parameters to the JavaScript-to-Java Bridging service 114-2.

The JavaScript-to-Java Bridging service 114-2 may be implemented to translate the JavaScript method calls and parameters into corresponding Java calls and parameters based upon a defined Java API. In one example the JavaScript-to-Java Bridging service 114-2 may utilize Node.js, an open-source JavaScript runtime environment, and the "java" module, a bridge technology to connect JavaScript code with existing Java APIs. Node.js is a Java runtime environment that allows execution of JavaScript commands for server-side scripting operations. The JavaScript-to-Java Bridging service 114-2 may extend the functionality of Node.js to invoke existing Java APIs from JavaScript code. For example, if the JavaScript call received from the object request processing service 112 is a query call to retrieve all employees that have 5 years of experience, the JavaScript language ORM API processing service 114-1 may parse the query call to identify the query parameters including the container class name for employee. The JavaScript-to-Java Bridging service 114-2 may then translate the query parameters for querying the employees into a corresponding Java API call that includes the container class name for employee and a corresponding Java method call for a query for employees that have 5 years of experience. The JavaScript language ORM service 114, upon generating the Java API request, sends the Java API request to the Java ORM system 120. The JavaScript-to-Java Bridging service 114-2 may be used to invoke the existing Java APIs from the JavaScript code either synchronously or asynchronously.

Figure 8:
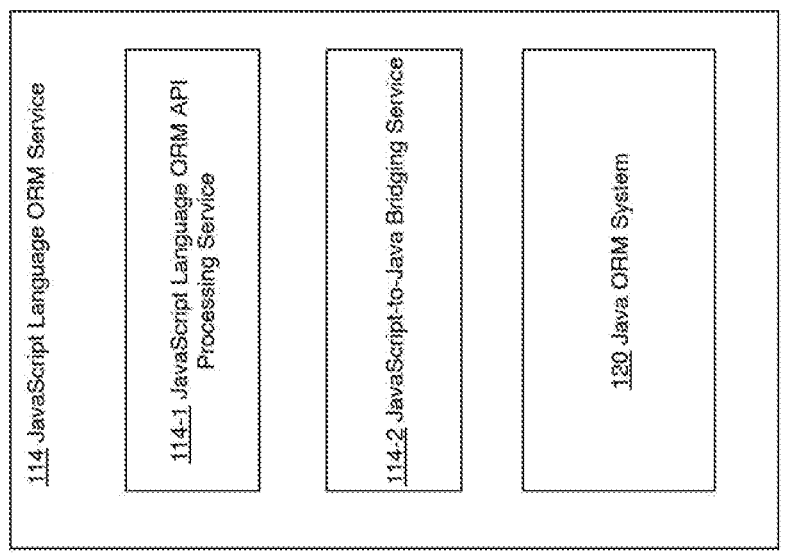
FIG. 8 is a block diagram depicting the components that make up the JavaScript language ORM service, according to an embodiment.

In another embodiment, the JavaScript language ORM service 114 may include the JavaScript language ORM API processing service 114-1, JavaScript-to-Java Bridging service 114-2, and the Java ORM system 120. FIG. 8 is a block diagram depicting the components that make up the JavaScript language ORM service 114, according to this embodiment.

Java Object Relational Mapping System

Figure 3:
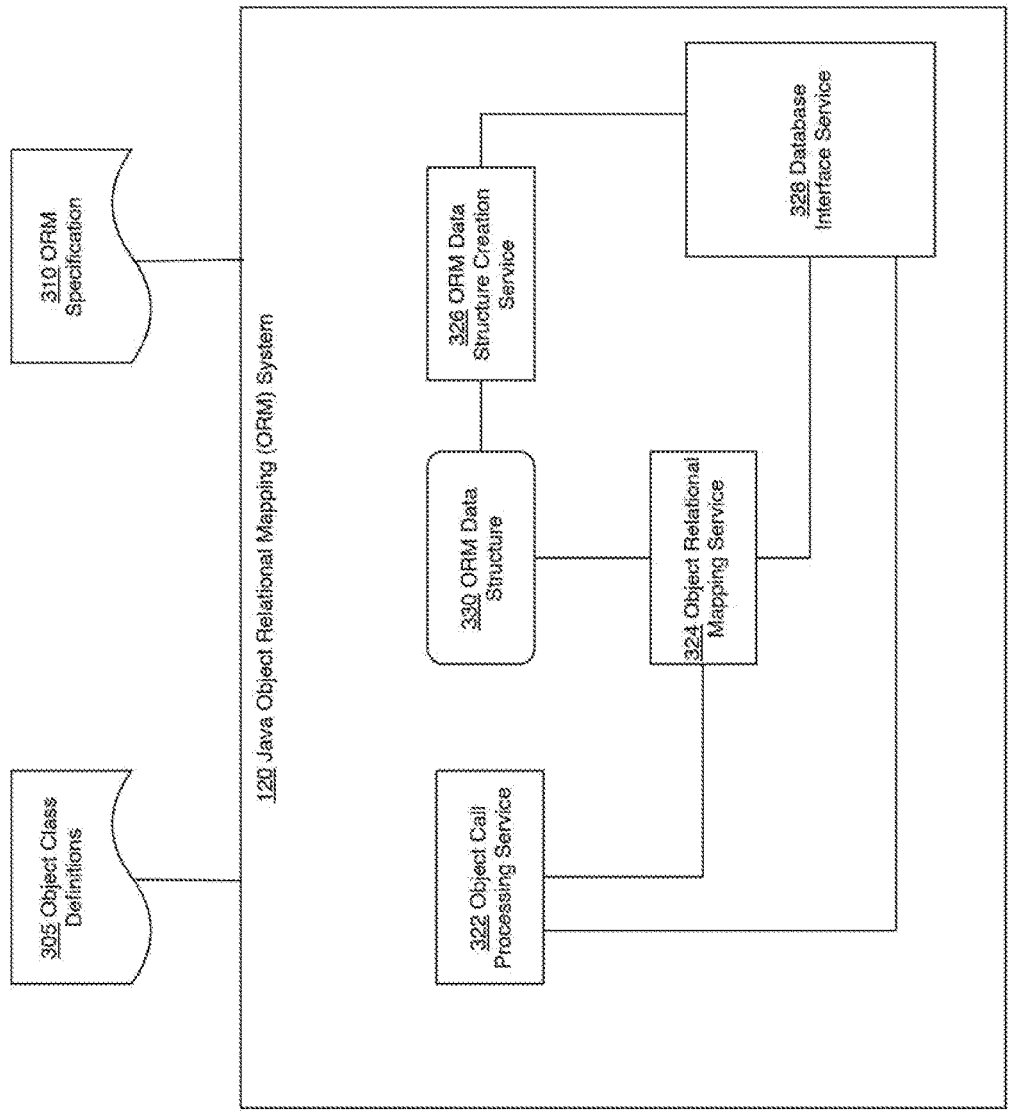
FIG. 3 is a block diagram depicting components of a Java object relational mapping system, according to an embodiment.

In an embodiment, the Java ORM system 120 may be implemented to receive Java requests to perform operations on data stored in database 162 and generate one or more database requests that contain database operations to be performed on data stored in database 162. FIG. 3 is a block diagram depicting components of the Java ORM system 120. In an embodiment, the Java ORM system 120 comprises an object call processing service 322, an object relational mapping service 324, an ORM data structure creation service 326, a database interface service 328, and a generated ORM data structure 330.

In an embodiment, the ORM data structure 330 represents information that maps attributes of the object model to corresponding database attributes defined within a database schema (tables and constrains) of the database. In an embodiment, the ORM data structure includes object class information, object attribute information, primary key information, table information, and column information. In an embodiment, the ORM specification 310 represents a declarative specification that includes information for defining mappings between the object model and the relational model. The ORM specification 310 may be based on a set of rules, herein referred to as ORM Grammar. The ORM Grammar represents an extensible set of rules, including syntax, for textually describing mappings between an object-oriented system and a relational system in a declarative way.

In an embodiment, the ORM data structure creation service 326 is implemented to generate the ORM data structure 330 based upon the ORM specification 310. For example, the ORM data structure creation service 326 parses the ORM specification 310 using the rule specified in the ORM Grammar.

In an embodiment, the object class definitions 305 define each class that may be stored within the database 162, including their structure, and how to get and set values within each object, via defined methods. In an embodiment, the object class definitions 305 may include definitions of container classes corresponding to the data object classes. In an embodiment, the object call processing service 322 is implemented to receive Java API calls from the JavaScript language ORM service 114 and generate corresponding database calls for execution by the DBMS 160. The object call processing service 322 determines how to translate the received Java API call into database operations using the object class definitions 305 and the ORM data structure 330 to identify the database operations that are mapped to the Java API calls received.

In an embodiment, the object call processing service 322 may use reflection to inspect class structures, instantiate objects, and to get and set values of data object attributes using accessor methods and mutator methods.

In an embodiment, the database interface service 328 is implemented to retrieve and manipulate data, including metadata, stored in the database 162. One example of the database interface service 328 may be a Java JDBC driver, which enables Java applications to interact with a database. The database interface service 328 may be implemented to interact with several different types of databases, including but not limited to, relational databases, object databases, or any other type of database.

Further details describing the Java ORM system 120 and its elements may be found in U.S. Pat. No. 10,437,564, granted on Oct. 8, 2019, the entire contents of which are hereby incorporated by reference, and U.S. Pat. No. 6,163,776, granted on Dec. 19, 2000, the entire contents of which are hereby incorporated by reference.

Communication Layer

In an embodiment, the communication layer 116 may be programmed or configured to perform input/output interfacing functions including receiving requests from client devices 152-156 and sending requests to the DBMS 160. For example, the communication layer 116 may implement a set of send and receive queues to send and receive request messages to and from the client devices 152-156 and the DBMS 160.

DBMS Overview

DBMS 160 manages a database. DBMS 160 may comprise one or more databases 162. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Computing devices interact with a database 162 of DBMS 160 by submitting to the DBMS 160 commands that cause the DBMS 160 to perform operations on data stored in database 162. A computing device may run one or more applications, such as the data object persistence service 110, that interact with the DBMS 160.

A database command may be in the form of a database statement that conforms to a database language. A database language for expressing the database commands is SQL. There are many different versions of SQL, some versions are standard and some proprietary, and there are a variety of extensions. Data Definition Language (DDL) commands are issued to the DBMS 160 to create or configure database schema objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data.

The database dictionary is modified according to DDL commands issued to add, modify, or delete database objects. For example, in response to receiving a DDL statement to create table "person", a database server alters metadata in a database dictionary to define table and its columns. A database dictionary is referred to by a DBMS 160 to determine how to execute database commands submitted to a DBMS 160.

A DBMS 160 receives queries issued against a database object managed by a database system. A query optimizer associated with the database system may generate one or more different candidate execution plans for a query, which are evaluated by the query optimizer to determine which execution plan should be used to compute the query.

Database Operations

Database requests generated by the data object persistence service 110 and sent to the DBMS 160 may represent either a database query request, an insert request to insert new data into one or more tables, an update request to update data values in one or more tables, or a delete request to delete data from one or more tables.

In an embodiment, a database request representing an insert, when executed, may cause one or more new rows to be inserted into one or more database tables. For example, if the database request is a request to insert new employee information into an EMPLOYEE table, then the result of the database request may be generation of one or more new rows representing data for the new employee.

In an embodiment, a database request representing a query may be a request to query data stored in one or more tables of the database, where the one or more tables contain columns corresponding to data object attributes associated with the one or more data objects. When the query request is executed, the DBMS 160 may query the one or more tables in the database for data matching the query parameters.

In an embodiment, a database request representing an update request, may cause the DBMS 160 to update data values in one or more database rows in the one or more tables to be updated based on the update request. In an embodiment, a database request representing a delete request may be a request to remove one or more database rows from one or more database tables in the database.

Processing Overview

Figure 4:
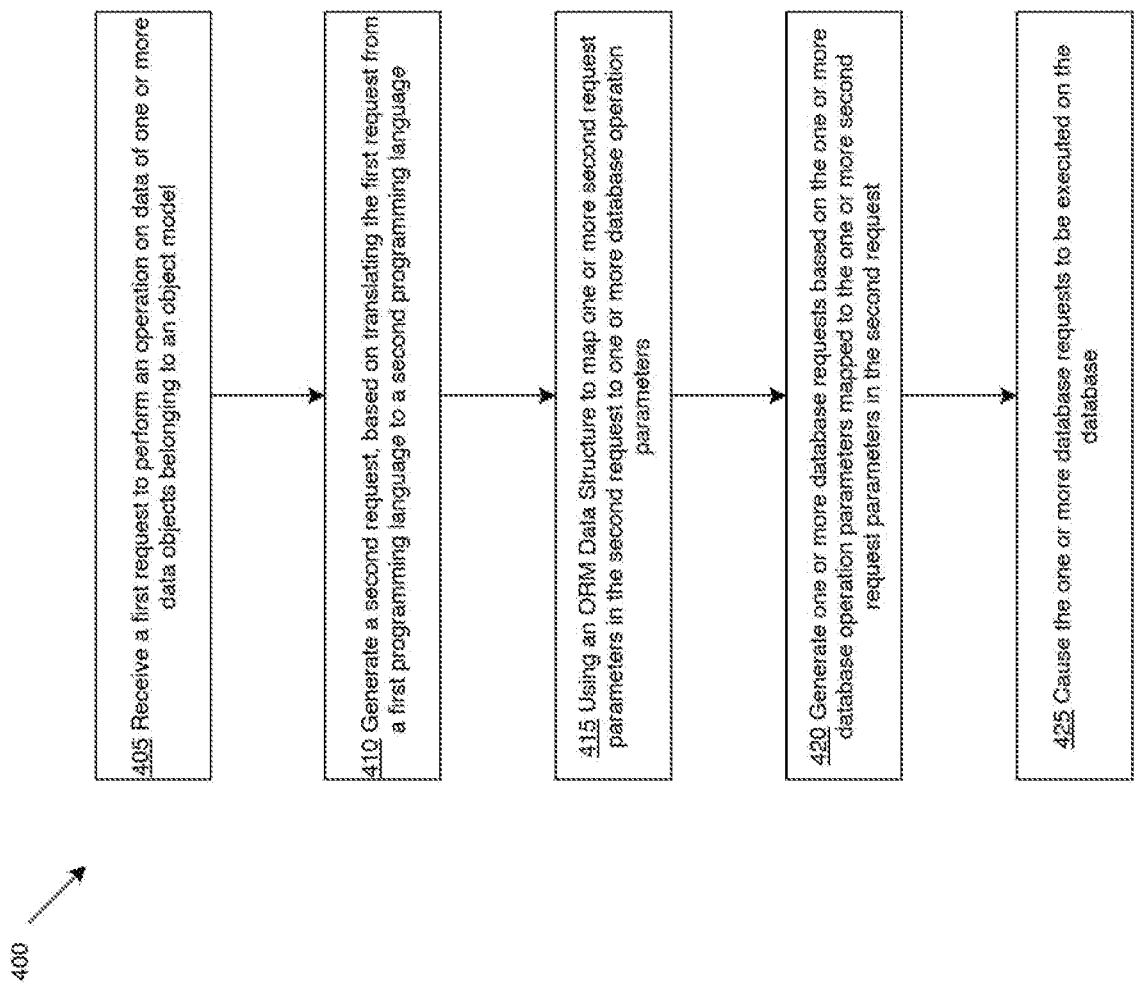
FIG. 4 depicts an example flowchart for receiving requests to perform operations on data and generate corresponding data requests for execution on a database that contains the data, according to an embodiment.

FIG. 4 depicts an example flowchart for receiving requests to perform operations on data objects and generate corresponding data requests for execution on a database that contains the data. Process 400 may be performed by a single program of multiple programs. The operations of the process as shown in FIG. 4 may be implemented using processor-executable instructions that are stored in computer memory. For purposes of providing a clear example, the operations of FIG. 4 are described as performed by components of system 100. For the purposes of clarity, process 400 is described in terms of a single entity.

In an embodiment, operations of process 400 are performed on data stored within tables in a database managed by DBMS 160. For illustrative purposes, the following example ORM data structure will be referenced, where an object container class "Employee" includes attributes that are mapped to a corresponding "EMPLOYEE" table and its columns:

| Object CLASS: Employee | | | DB Table: EMPLOYEE | |
|---|---|---|---|---|
| Attribute name | data type | → | Column name | data type |
| id | number | → | ID | int |
| name | string | → | NAME | varchar |
| exempt | boolean | → | EXEMPT | Boolean |
| compensation | double | → | SALARY | double | where attribute names and their respective data types are mapped to column names for table EMPLOYEE. In an embodiment, by default the ORM data structure may map class attributes to table columns with the same name and data type. For example, attributes "id", "name", and "exempt" each map to table column names "ID", "NAME", and "EXEMPT" respectively. However, a class attribute name may be mapped to a different column name by specifying a mapped name within the ORM specification. For example, the class attribute "compensation" may be mapped to a table column named "SALARY".

In an embodiment, mappings for class attribute-to-table column names are specified in the ORM specification 310 file, which is used by the Java ORM system 120 to create the ORM data structure 330. An example of the ORM specification 310 is depicted as:

```
CLASS com.mycompany.myproject.model.JSON_Employee
    // First declare all the persistent JSON properties
    VIRTUAL_ATTRIB id ATTRIB_TYPE int
    VIRTUAL_ATTRIB name ATTRIB_TYPE java.lang.String
    VIRTUAL_ATTRIB exempt ATTRIB_TYPE boolean
    VIRTUAL_ATTRIB compensation ATTRIB_TYPE double
    // Now provide the rest of the mapping specification for this class
    PRIMARY_KEY id
    SQLMAP FOR compensation COLUMN_NAME salary
;
``` where the mapping applies to the object container class called "com.mycompany.myproject.model.JSON_Employee". The corresponding conceptual JSON object class name may simply be "Employee". Each of the class attributes, "id", "name", "exempt", and "compensation" are declared as VIRTUAL_ATTRIB JSON properties. The attribute "id" which will map to column "id" is designated as the primary key for table EMPLOYEE based on the line "PRIMARY_KEY id". The line "SQLMAP FOR compensation COLUMN_NAME salary" defines a mapping for the class attribute "compensation" to the table column named "salary". In the absence of explicit instructions to map the class attribute name to another column name, the Java ORM system 120 is configured to generate table COLUMN names that are the same as the class attribute names, as it is shown for "id", "name", and "exempt".

Upon generating the ORM data structure 330, by the Java ORM system 120, the data object persistence service 110 may be able to accept data requests from client devices 152-156. Referring back to FIG. 4, in operation 405, process 400 receives a first request to perform an operation on data of one or more data objects belonging to an object model. In an embodiment, the object request processing service 112 receives the first request to perform the operation on data of one or more data objects that may be stored within the database 162. For example, the first request received may be a RESTful POST call to insert an entity into the EMPLOYEE table. The POST request is used to insert data from one or more JSON objects that are specified using an "entity" tag in the body of the HTTP POST request. The URI for the POST operation may be represented as:

http://localhost:80/jdx/v1/Employee where the communication layer 116 implements a listener to listen for HTTP requests, such as the one above, on port 80 of the localhost. In this example, "Employee" is the name of the type (class) of the JSON object specified in the body of the request using the "entity" tag. An example of the body of the first request received is:

{"entity":{"id":39, "name":Mike39, "exempt":true, "compensation":53939}} where the data to be inserted into table EMPLOYEE is for employee Mike39 having an id number as "39", a compensation amount of "53939", and is labeled as an "exempt" employee.

Figure 5:
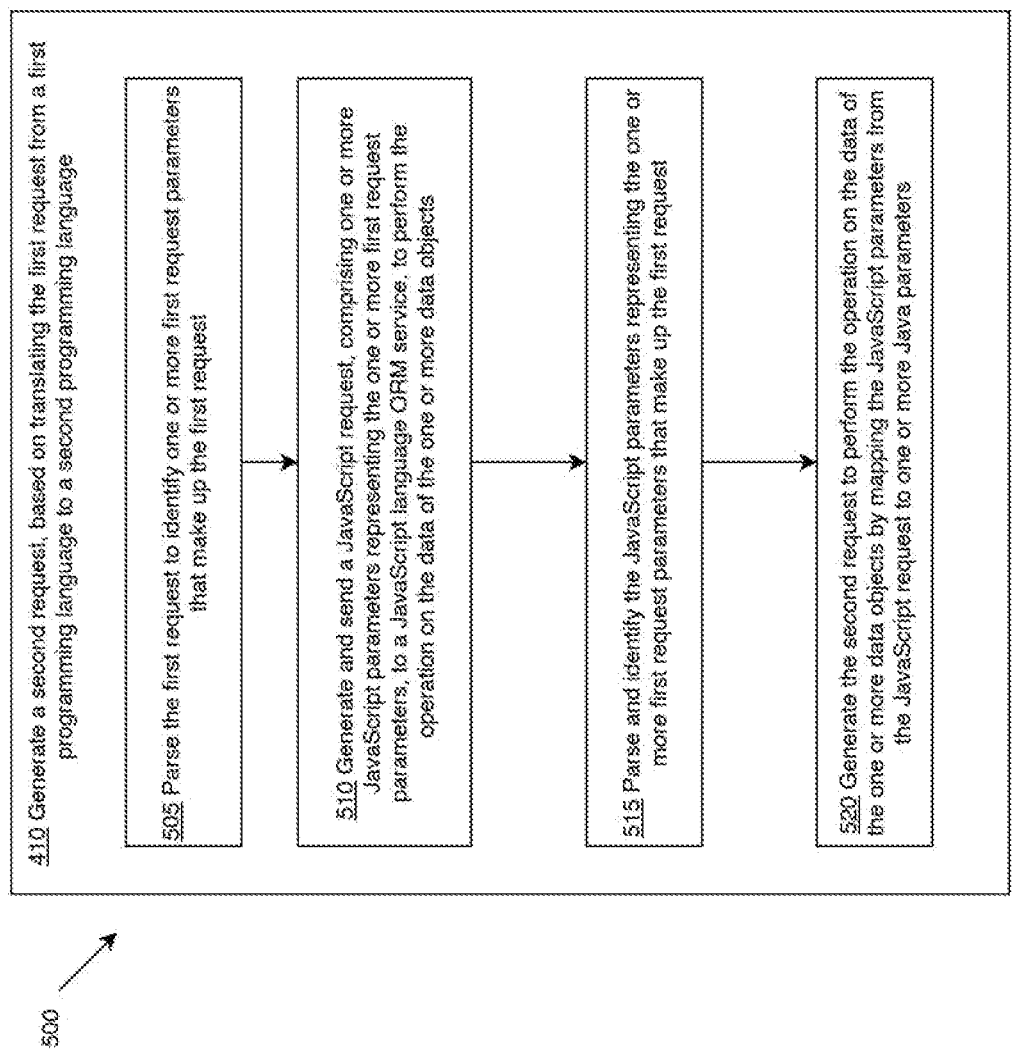
FIG. 5 depicts a flowchart for generating the second request based on translating the first request from the first programming language to the second programming language, according to an embodiment.

In operation 410, process 400 generates a second request, based on translating the first request from a first programming language to a second programming language. FIG. 5 depicts a flowchart for generating the second request based on translating the first request from the first programming language to the second programming language. Process 500 may be performed by a single program of multiple programs. The operations of the process as shown in FIG. 5 may be implemented using processor-executable instructions that are stored in computer memory. For purposes of providing a clear example, the operations of FIG. 5 are described as performed by components of system 100. For the purposes of clarity, process 500 is described in terms of a single entity.

In operation 505, process 500 parses the first request to identify one or more first request parameters that make up the first request. In an embodiment, the object request processing service 112 parses the received first request to identify the parameters in the first request. For example, the object request processing service 112 parses the first request of http://localhost:80/jdx/v1/Employee to identify the POST request on the class name "Employee". In another example, if the first request is a GET request to retrieve a count of employees, as a URI: "http://localhost:80/jdx/v1/Employee/getAggregate?attribute=id&aggregateType=COUNT", the object request processing service 112 would parse the URI and identify the version, v1, and a class name parameter, Employee, and the additional parameters including "getAggregate?attribute=id&aggregateType-COUNT" which indicates that a count of the number of employee IDs is to be returned as the result.

In operation 510, process 500 generates and sends a JavaScript request, comprising one or more JavaScript parameters representing the one or more first request parameters, to the JavaScript language ORM service 114 to perform the operation on the data of the one or more data objects. In an embodiment, the object request processing service 112 generates a JavaScript request by translating the conceptual JSON object class name into a container class name defined in the mapping configuration. For example, the conceptual JSON object class name may be "Employee" which may map to the corresponding container class name of "MyCompanyEmployee" or any other name. In an embodiment, the object request processing service 112 may utilize classnames mapping configurations that map conceptual JSON object class names to their corresponding container class names. Other embodiments are not limited to translating a conceptual JSON object class name. For example, if the first request contains data formatted using another format, such as XML, then the object request processing service 112 may be configured to translate the XML formatted class name to their corresponding container class name. The JavaScript request generated by the object request processing service 112 is then sent to the JavaScript language ORM service 114.

In operation 515, process 500 parses and identifies the JavaScript parameters representing the one or more first request parameters that make up the first request. In an embodiment, the JavaScript language ORM API processing service 114-1 parses and identifies request parameters from the received JavaScript request. The parameters may include the container class name, JavaScript method calls, and one or more JavaScript input parameters for the corresponding JavaScript method call.

In operation 520, process 500 generates the second request to perform the operation on the data of the one or more data objects by mapping the JavaScript parameters from the JavaScript request to one or more Java parameters. In an embodiment, the JavaScript-to-Java bridging service 114-2 maps the JavaScript code and parameters to corresponding Java API to performs the desired operation. In an embodiment, the JavaScript code and parameters mapping to Java parameters may not be a one-to-one correspondence. For example, the Java API may include multiple method calls and/or multiple different Java parameters that may map to the provided JavaScript code and parameters. Conversely, different JavaScript code and/or parameters may map to a single Java method call. In an embodiment, the JavaScript-to-Java bridging service 114-2 may execute the corresponding Java API synchronously or asynchronously.

Referring back to FIG. 4, in operation 415, process 400 uses the ORM data structure 330 to map one or more parameters in the second request to one or more database parameters. In an embodiment, the Java ORM system 120 receives the second request, parses and identifies the one or more parameters from the second request, and maps the parameters to corresponding database parameters. For example, the object call processing service 322 identifies, from the request to insert an Employee entity named Mike39 into the EMPLOYEE table, the object class attributes of "id=39", "name=Mike39", "exempt=true", and "compensation=53939". The object relational mapping service 324 uses the ORM data structure 330 to map each of the object class attributes to their corresponding columns in the EMPLOYEE table. As described above, the mapping from object class attributes to database table columns is:

| Object CLASS: Employee | | | DB Table: EMPLOYEE | |
| --- | --- | --- | --- | --- |
| Attribute name | Value | → | Column name | Value |
| id | 39 | → | ID | 39 |
| name | Mike39 | → | NAME | Mike39 |
| exempt | true | → | EXEMPT | true |
| compensation | 53939 | → | SALARY | 53,939 |

In operation 420, process 400 generates one or more database requests based on the one or more database operation parameters mapped to the one or more parameters of the second request. In an embodiment, the database interface service 328 is used to generate the one or more database requests. The object relational mapping service 324 may make an API call provided by the database interface service 328 to perform the corresponding database operation. For instance, the API call may be a Java Database Connectivity (JDBC) API call provided by the database interface service 328.

In operation 425, process 400 causes the one or more database requests to be executed on the database. In an embodiment, the database interface service 328 may use the communication layer 116 to establish a database connection to DBMS 160 and send the one or more database operation commands to the DBMS 160 to execute the one or more database operation. Using the Mike39 POST request example, the database interface service 328 may execute a database INSERT command to insert a row into the EMPLOYEE table for Mike39.

In an embodiment, the DBMS 160 may receive and process the request on the database 162 managed by DBMS 160. The database may return a result back to the data object persistence service 110. Using the Mike39 POST request example, the result may be a successful acknowledgement indicating that data has been inserted into the EMPLOYEE table or an unsuccessful acknowledgement indicating that the data was not inserted into the EMPLOYEE table. The unsuccessful acknowledgement may also include any error message, for example a primary key violation, produced by the DBMS 160. In other examples, the acknowledgement by the DBMS 160 may include a result set. For instance, if the database operation was a SELECT statement for data to be retrieved from the database, then the acknowledgement may include a result set of the requested data.

In an embodiment, the Java ORM system 120 may perform a database operation with a SELECT statement and receive a result set containing data for a query request done by the client device 152. The Java ORM system 120 may use the ORM data structure 330 to translate the result set data labeled using database table columns to their corresponding object class attribute names and create container class objects where each container class object encapsulates the attributes of a JSON object. The Java ORM System 120 may then use the incoming Java API method calls to send the container class objects as a return value back to the JavaScript language ORM service 114. The JavaScript language ORM service 114 may retrieve the encapsulated JSON objects from the returned container class objects and send those JSON objects back to the object request processing service 112, which may generate a response containing those JSON object and use the communication layer 160 to send the response back to the client device 152.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
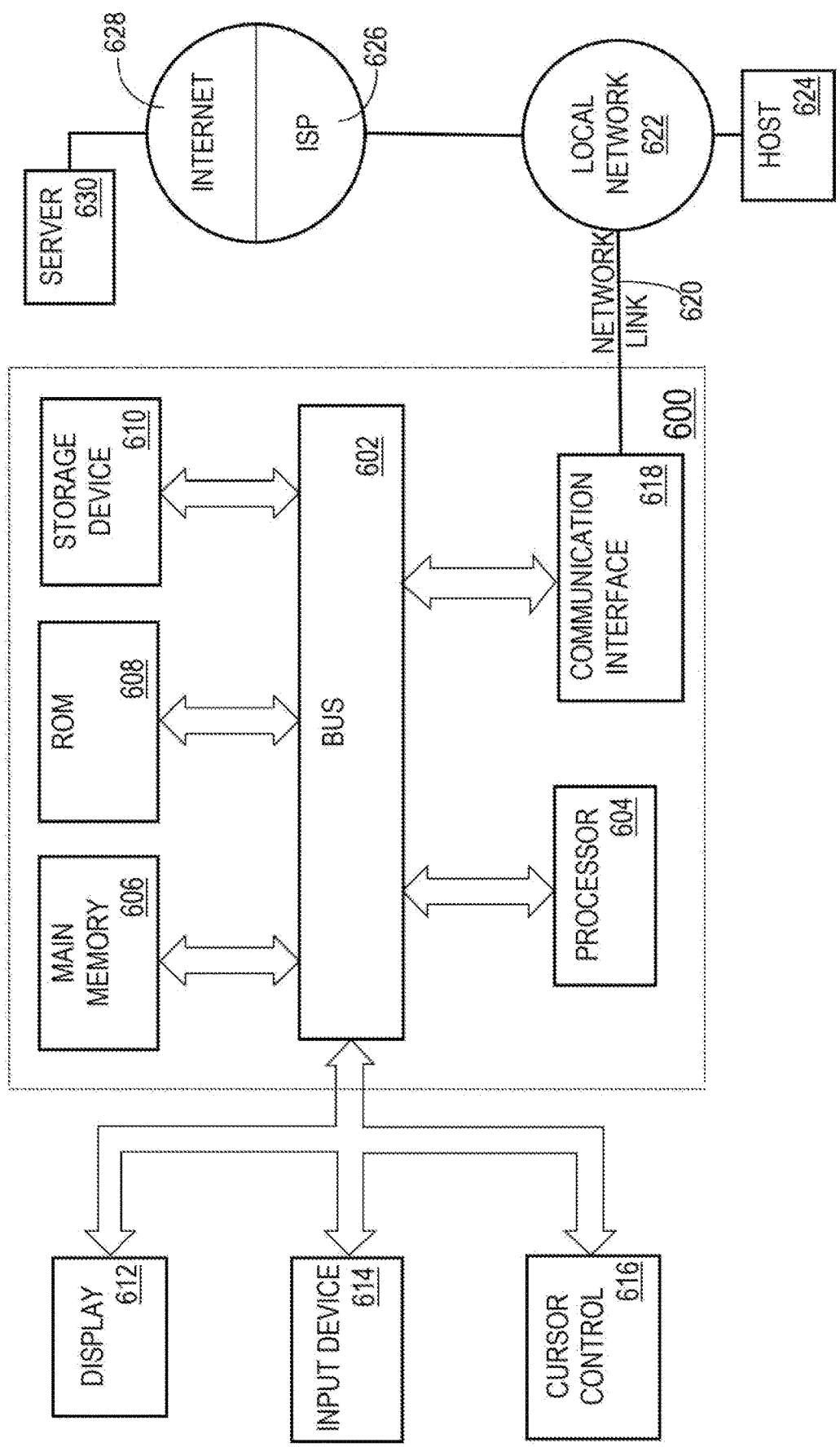
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a light-emitting diode (LED) display or a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams.

The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented system for converting object-oriented data object requests into database operations to be performed on data in a database, the system comprising:
    one or more non-transitory computer-readable storage media storing:
        an object relational mapping (ORM) data structure defining a mapping between data object attributes of an object model and database properties defined within a database schema of the database;
        wherein the object model is at least partially defined by a JSON object class;
    one or more hardware processors executing:
        an object request processing service, the object request processing service receiving REST API requests, and translating input parameters of a REST API request into corresponding JavaScript parameters and a JavaScript request;
        a JavaScript language ORM service, communicatively coupled to the object request processing service, the JavaScript language ORM service translating the JavaScript request into a corresponding Java request by using a JavaScript-to-Java bridging service; and
        a Java ORM system, communicatively coupled to the JavaScript language ORM service and the ORM data structure, the Java ORM system translating the Java request into one or more database operations by mapping Java request operations and Java request parameters from the Java request to corresponding database properties defined in the ORM data structure; and
    a communication layer, communicatively coupled to one or more external client devices, the database, the object request processing service, and the Java ORM system, and operable to send and receive data communications between internal elements of the computer-implemented system and computing elements external to the computer-implemented system.

2. The system of claim 1, wherein the Java ORM system runs in a containerized program system.

3. A system for transferring data between a client and a relational system comprising a relational model defined by tables, the system comprising:
    one or more non-transitory computer-readable storage media storing:
        an object model, wherein the object model is at least partially defined by a JSON object class; and
        an object relational mapping (ORM) data structure defining a mapping between the object model and the relational model, the ORM data structure produced from a declarative ORM specification; and
    one or more hardware processors executing a data object persistence service, wherein the data object persistence service comprises an object request processing service and a JavaScript language ORM service comprising a JavaScript language ORM API processing service and a Java ORM system, and wherein executing the data object persistence service comprises:
        receiving a REST API call to transfer data of a JSON object of the JSON object class between the client and the relational system; and
        transferring the data of the JSON object between the client and the relational system according to the mapping between the object model and the relational model defined by the ORM data structure in response to receiving the REST API call, wherein transferring the data comprises:
            translating the REST API call to a JavaScript language ORM API call with the object request processing service;
            performing data transfer by the JavaScript language ORM service in response to the JavaScript language ORM API call;
            translating the JavaScript language ORM API call to a Java language ORM API call with the JavaScript language ORM API processing service; and
            performing, by the Java ORM system using a database interface service operable to store and receive data in the relational system, data transfer between the JavaScript language ORM API processing service and the relational system according to the declarative ORM specification in response to the translated Java language ORM API call from the JavaScript language ORM API processing service.

4. The system of claim 3, wherein the JavaScript language ORM API processing service comprises a JavaScript-to-Java bridging service operable to translate the JavaScript language ORM API call to the Java language ORM API call.

5. The system of claim 3, wherein the database interface service is provided by a Java Database Connectivity (JDBC) driver.

6. The system of claim 3, wherein the data object persistence service uses a reflection facility of a programming language to transfer the data of the JSON object.

7. The system of claim 3, wherein the data object persistence service transfers the data of the JSON object through an object container stored in the one or more non-transitory machine-readable storage media and encapsulating the data of the JSON object.

8. The system of claim 3, wherein the REST API call has an associated universal resource identifier (URI) comprising a parameter for a name of the JSON object class.

9. The system of claim 3, wherein the data object persistence service runs in a containerized program system.

10. The system of claim 3, wherein the relational system is a SQL-based database system.

11. The system of claim 3, wherein the relational system is an object-oriented database system.

12. The system of claim 3, wherein one or more REST API calls to transfer data are executed synchronously.

13. The system of claim 3, wherein one or more REST API calls to transfer data are executed asynchronously.

14. A computer program product for converting object-oriented data object requests into database operations to be performed on data in a database, the computer program product comprising:
one or more non-transitory computer-readable storage media comprising instructions, which when executed by one or more processors, cause:
receiving, at an object request processing service, REST API requests;
translating, by the object request processing service, input parameters of a REST API request into corresponding JavaScript parameters and a JavaScript request;
translating, by a JavaScript language object relational mapping (ORM) service that is communicatively coupled to the object request processing service, the JavaScript request into a corresponding Java request by using a JavaScript-to-Java bridging service; and
translating, by a Java ORM system that is communicatively coupled to the JavaScript language ORM service and an ORM data structure, the Java request into one or more database operations by mapping Java request operations and Java request parameters from the Java request to corresponding database properties defined in the ORM data structure, the ORM data structure defining a mapping between data object attributes of an object model and database properties defined within a database schema of the database, wherein the object model is at least partially defined by a JSON object class; and
a communication layer, communicatively coupled to one or more external client devices, the database, the object request processing service, and the Java ORM system, and operable to send and receive data communications between internal elements of the computer program product and computing elements external to the computer program product.

15. The computer program product of claim 14, wherein the one or more non-transitory computer-readable storage media comprises further instructions which, when executed by the one or more processors, cause:
performing the translated one or more database operations using a database interface service operable to store and receive data in the database.

16. The computer program product of claim 14, wherein the one or more non-transitory computer-readable storage media comprises further instructions which, when executed by the one or more processors, cause:
using, by the Java ORM system, a reflection facility of a programming language to transfer data of a JSON object that is referenced in the REST API request.

17. The computer program product of claim 14, wherein the one or more non-transitory computer-readable storage media comprises further instructions which, when executed by the one or more processors, cause:
transferring, by the Java ORM system, data of a JSON object referenced in the REST API request through an object container stored in a non-transitory machine-readable medium and encapsulating the data of the JSON object.

18. The computer program product of claim 14, wherein the one or more non-transitory computer-readable storage media comprises further instructions which, when executed by the one or more processors, cause:
running the Java ORM system in a containerized program system.

19. The computer program product of claim 14, wherein the one or more non-transitory computer-readable storage media comprises further instructions which, when executed by the one or more processors, cause:
using a parameter from a universal resource identifier (URI) of at least one of the REST API requests for a JSON object class name.

* * * * *